(12) United States Patent
Asao et al.

(10) Patent No.: US 6,252,330 B1
(45) Date of Patent: Jun. 26, 2001

(54) DYNAMO-ELECTRIC ROTOR WITH REDUCED MAGNETIC FLUX LEAKAGE AND WITH A STRUCTURE PERMITTING HIGH EFFICIENCY ASSEMBLY

(75) Inventors: Yoshihito Asao; Kyoko Higashino, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/065,571

(22) Filed: Apr. 24, 1998

(30) Foreign Application Priority Data

Nov. 13, 1997 (JP) ..................................... 9-312072

(51) Int. Cl.[7] ............... H02K 3/52; H02K 1/22; H02K 1/24; H02K 21/04
(52) U.S. Cl. ............................ 310/263; 310/181
(58) Field of Search ................ 310/181, 263, 310/194, 43, 257

(56) References Cited

U.S. PATENT DOCUMENTS

| 5,325,003 | * | 6/1994 | Saval et al. ............................ 310/43 |
| 5,483,116 | * | 1/1996 | Kusase et al. ....................... 310/263 |
| 5,969,459 | * | 10/1999 | Taniguchi et al. ................... 310/263 |

FOREIGN PATENT DOCUMENTS

| 61-254040 | | 11/1986 | (JP) . |
| 607308 | * | 4/1978 | (SU) .................................... 310/263 |

* cited by examiner

*Primary Examiner*—Karl Tamai
(74) *Attorney, Agent, or Firm*—Sughrue, Mion, Zinn, Macpeak & Seas, PLLC

(57) ABSTRACT

A rotor for a dynamo-electric machine permits higher manufacturing efficiency. The rotor is equipped with a plurality of magnetic portions which are provided between adjacent triangular magnetic poles in an orientation that reduces the leakage of the magnetic flux between the aforesaid triangular magnetic poles. The magnetic portion are joined to at least one of a first flange and a second flange.

3 Claims, 9 Drawing Sheets

DYNAMO-ELECTRIC ROTOR WITH REDUCED MAGNETIC FLUX LEAKAGE AND WITH A STRUCTURE PERMITTING HIGH EFFICIENCY ASSEMBLY

BACKGROUND OF THE INVENTION

1. Field of the Invention

The present invention relates to a dynamo-electric machine rotor equipped with a magnet portion and provided between adjacent triangular magnetic poles for reducing the leakage of magnetic flux between the triangular magnetic poles, and a method of manufacturing same.

2. Description of Related Art

FIG. 10 is a sectional side elevation of a conventional vehicular AC generator and FIG. 11 is a perspective view of a rotor shown in FIG. 10. The AC generator is equipped with: a case 3 comprising of a front bracket 1 and a rear bracket 2 made of aluminum; a shaft 6 provided in the case 3 and having a pulley 4 fixed at one end thereof; a Randell-type rotor 7 secured to the shaft 6; fans 5 secured to both side surfaces of the rotor 7; a stator 8 secured to the inner wall surface of the case 3; a slip ring 9 secured to the other end of the shaft 6 for supplying current to the rotor 7; a pair of brushes 10 in sliding contact with the slip ring 9; a brush holder 11 which holds the brushes 10; a rectifier 12 electrically connected the stator 8 to for changing alternating current generated in the stator 8 to direct current; a heat sink 17 fitted onto the brush holder 11; and a regulator 18 bonded to the heat sink 17 for adjusting the magnitude of the AC voltage generated in the stator 8.

The rotor 7 is comprises by a rotor coil 13 through which current flows to generate magnetic flux, and a field core assembly 14 that covers the rotor coil 13 and in which magnetic poles are formed by the magnetic flux. The field core assembly 14 is a pair composed of first field core member 21 and second field core member 22 which are alternately meshed. The first field core member 21 and the second field core member 22 are made of iron. The first field core member 21 has triangular magnetic poles 23, and the second field core member 22 has triangular magnetic poles 24. A hexahedral magnet 19 is provided between adjacent ones of the triangular magnetic poles 23 and 24 in an orientation that reduces the leakage of magnetic flux between the triangular magnetic poles 23 and 24.

The stator 8 is provided with a stator core 15 and a stator coil 16 composed of a conductor wound around the stator core 15, in which alternating current is generated as the magnetic flux from the rotor coil 13 changes as the rotor 7 rotates.

In the vehicular AC generator configured as set forth above, current is supplied from a battery, not shown, to the rotor coil 13 via the brushes 10 and the slip ring 9 so as to generate magnetic flux. The triangular magnetic poles 23 of the first field core member 21 are magnetized to the N pole (positive polavity), while the triangular magnetic poles 24 of the second field core 22 are magnetized to the S pole (negative polavity).

The pulley 4 is driven by an engine and the rotor 7 is rotated through the shaft 6, so that a rotary magnetic field is supplied to the stator coil 16, generating an electromotive force in the stator coil 16. This AC electromotive force is rectified into direct current through the rectifier 12 and the voltage magnitude thereof is adjusted by the regulator 18 before it is supplied to the battery.

In a conventional rotor 7 of the vehicular AC generator, the hexahedral magnet 19, which has been magnetized in a direction so as to reduce the leakage of magnetic flux between the triangular magnetic poles 23 and 24, is secured to adjacent triangular magnetic poles 23 and 24 by using an adhesive agent. More specifically, the hexahedral magnet 19 is secured so that the side opposed to the triangular magnetic pole 23 magnetized to the N pole constitutes the N-pole surface of the magnet 19, while the side opposed to the triangular magnetic pole 24 magnetized to the S pole constitutes the S-pole surface of the magnet 19. This makes it possible to reduce ineffective magnetic flux, which leaks between the adjacent triangular magnetic poles 23 and 24 and therefore does not contribute to the power generation of the AC generator, so that the power generating efficiency of the AC generator is thereby increased.

The magnets 19, however, are each discretely positioned at twelve points between the triangular magnetic poles 23 and 24. Therefore, a lot of time is required to attach the magnets 19, leading to the problem of poor assembly efficiency.

SUMMARY OF THE INVENTION

The present invention has been made with a view toward solving the problem described above, and it is an object of the invention to provide a rotor for a dynamo-electric machine, that permits higher manufacturing efficiency and a method of manufacturing same.

To this end, in a rotor for a dynamo-electric machine, a plurality of magnetic portions are provided between adjacent ones of triangular magnetic poles in an orientation that reduces the leakage of magnetic flux between the triangular magnetic poles, and are joined to at least one of a first flange and a second flange.

In a preferred form of the rotor for a dynamo-electric machine, magnetic portions comprise magnetic members made of a magnetic material and covers, which cover the magnetic members and which are made of the same resin material as that of a bobbin.

In another preferred form of the rotor for a dynamo-electric machine, fitting portions, which are fitted on the sides of the triangular magnetic poles to prevent the magnetic portions from shifting radially outward, are formed on the sides of the magnetic portions.

In yet another preferred form of the rotor for a dynamo-electric machine, engaging portions, which engage with ends of triangular magnetic poles to prevent magnetic portions from shifting axially, are formed on the ends of the magnetic portions.

In another preferred form of the rotor for a dynamo-electric machine, locking portions, which engage with mating portions formed on the distal ends of magnetic portions to retain the magnetic portions between triangular magnetic poles, are formed on the outer periphery of either a first flange or a second flange.

In a method of manufacturing a rotor for a dynamo-electric machine, magnetic members are placed in a mold and resin is injection molded, to form a bobbin and magnetic portions integral with the bobbin.

DESCRIPTION OF THE PREFERRED EMBODIMENTS

Figure 10:
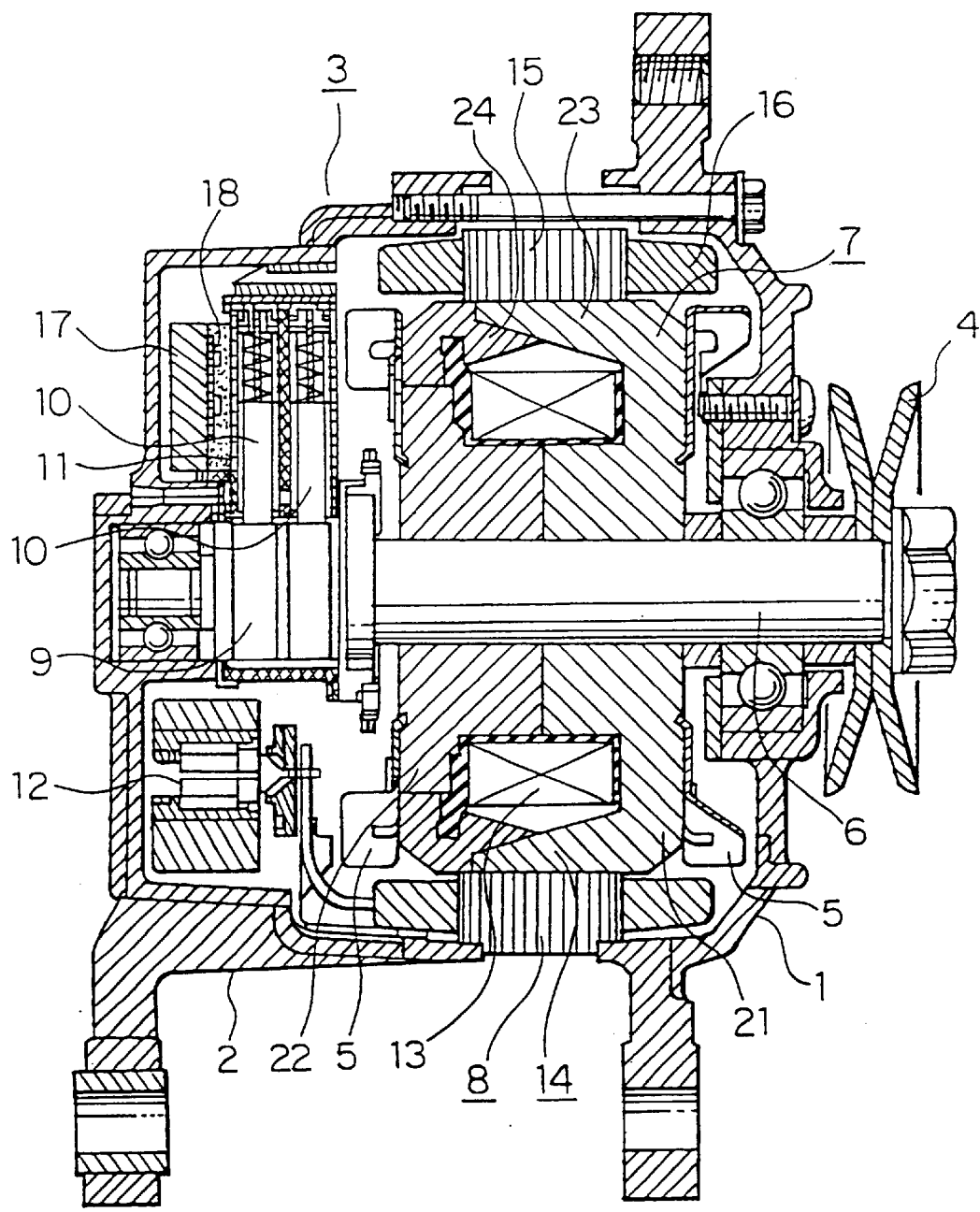
FIG. 10 is a sectional view illustrating a conventional vehicular AC generator.
Figure 11:
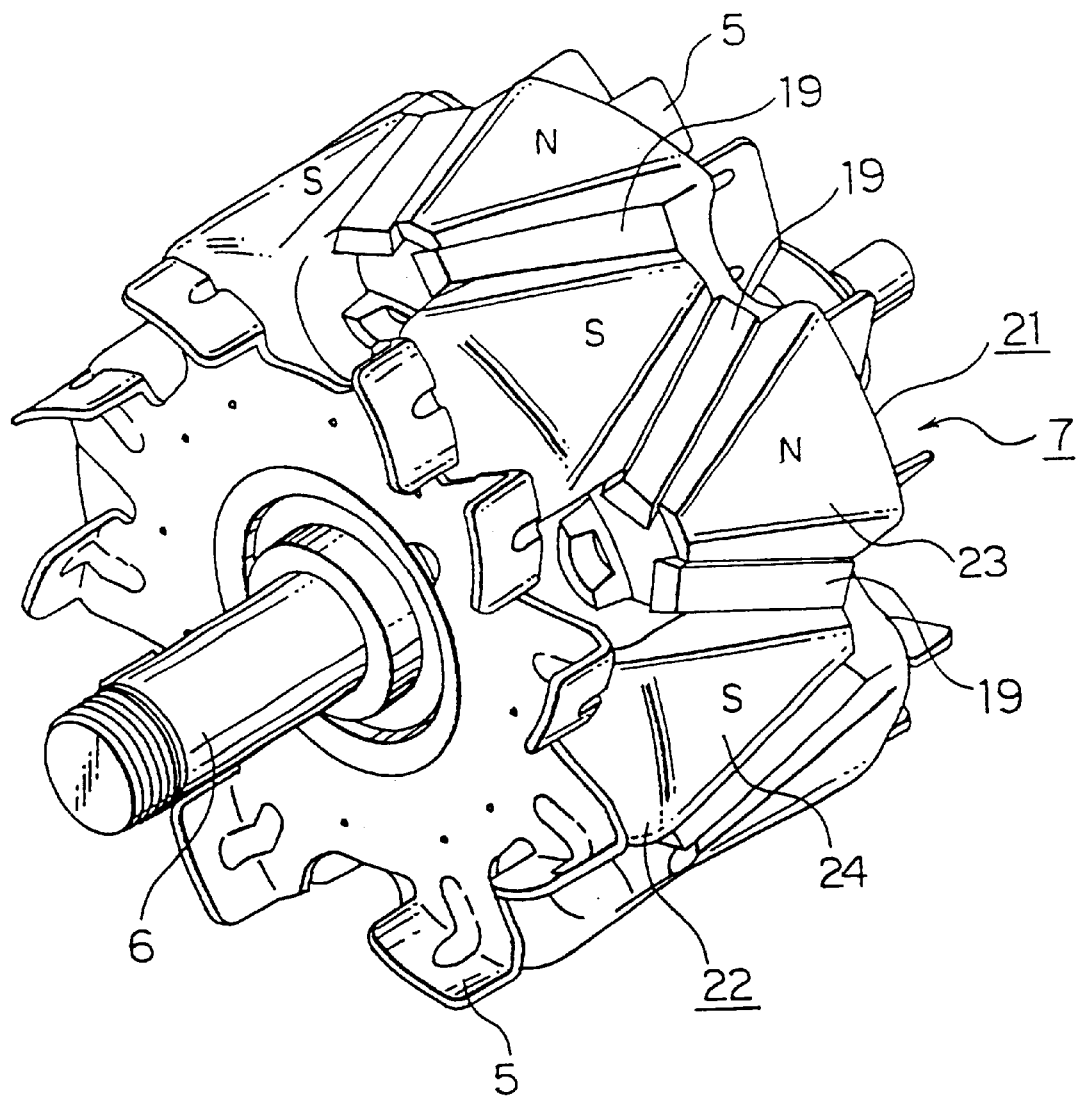
FIG. 11 is a perspective view illustrating the rotor shown in FIG. 10.

The rotor of a dynamo-electric machine in accordance with the present invention will now be explained. Parts that are similar to or correspond to those shown in FIG. 10 and FIG. 11 will be assigned like reference numerals.

[First Embodiment]

Figure 1:
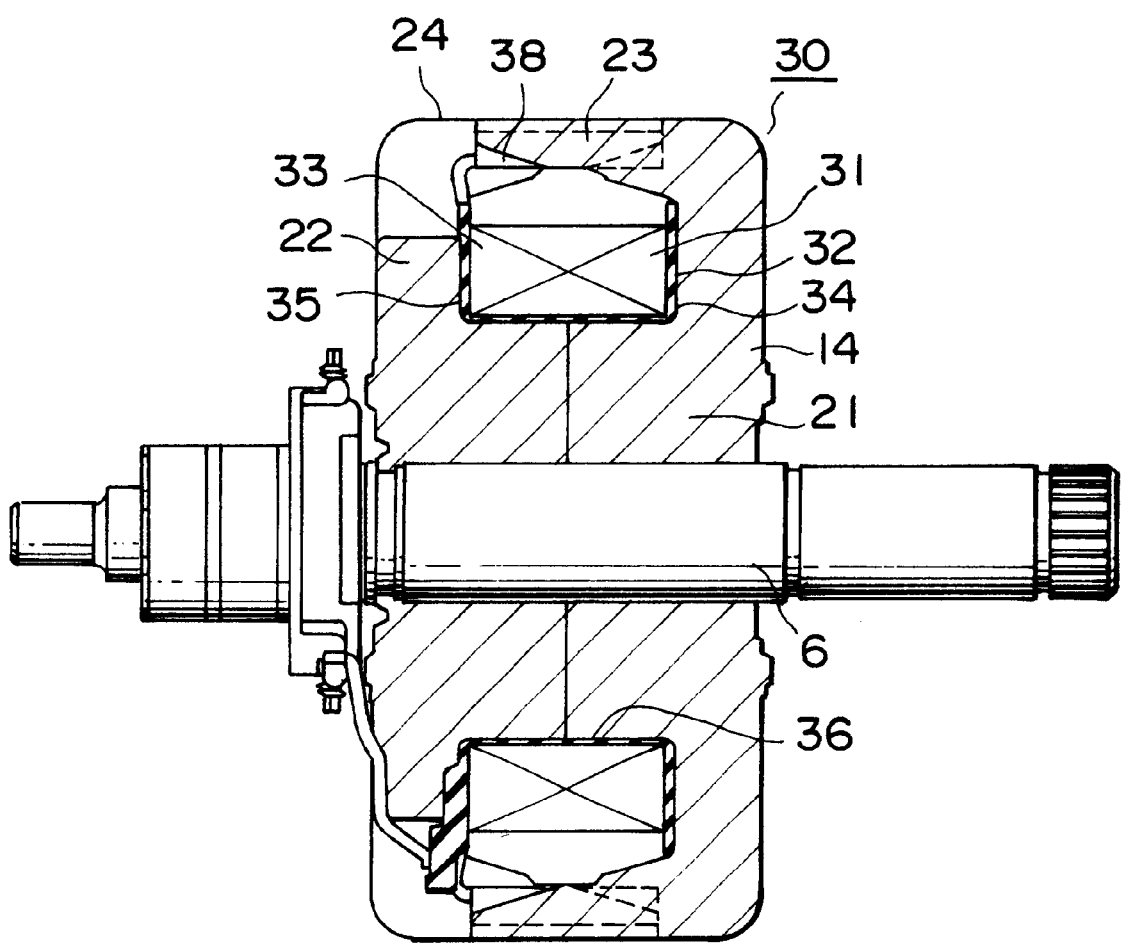
FIG. 1 is a sectional view illustrating a rotor of a vehicular AC generator of a first embodiment in accordance with the present invention.
Figure 2:
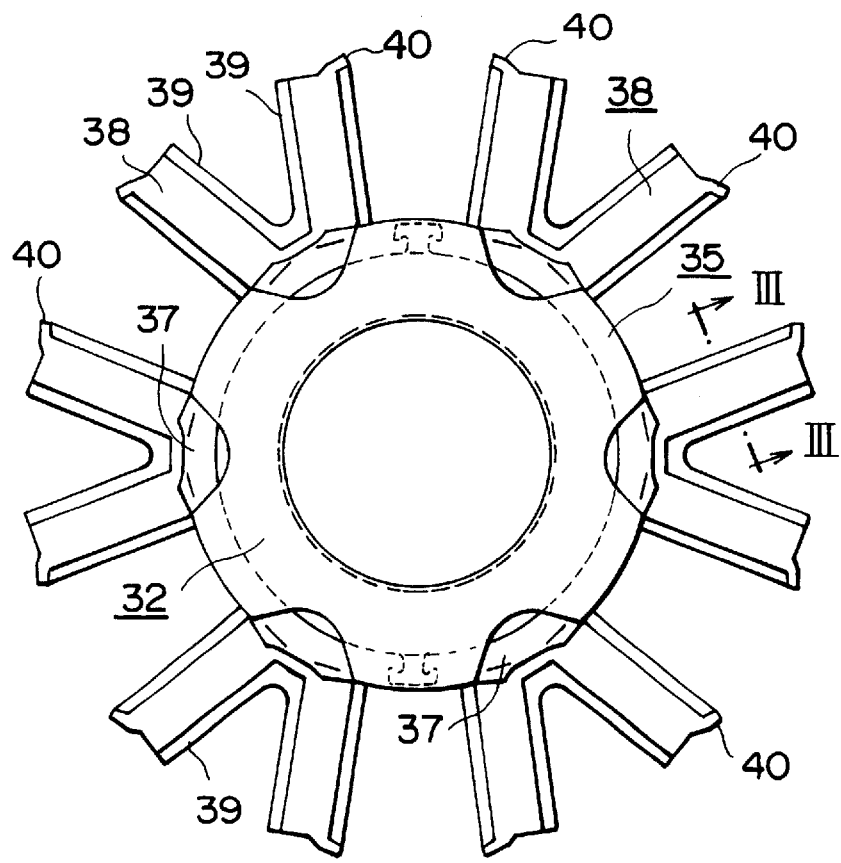
FIG. 2 is a side view of a bobbin and radially extending magnetic portions which are included in the rotor shown in FIG. 1.
Figure 3:
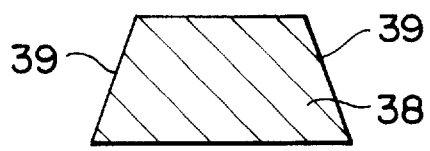
FIG. 3 is a sectional view at the line III—III of FIG. 2.
Figure 4:
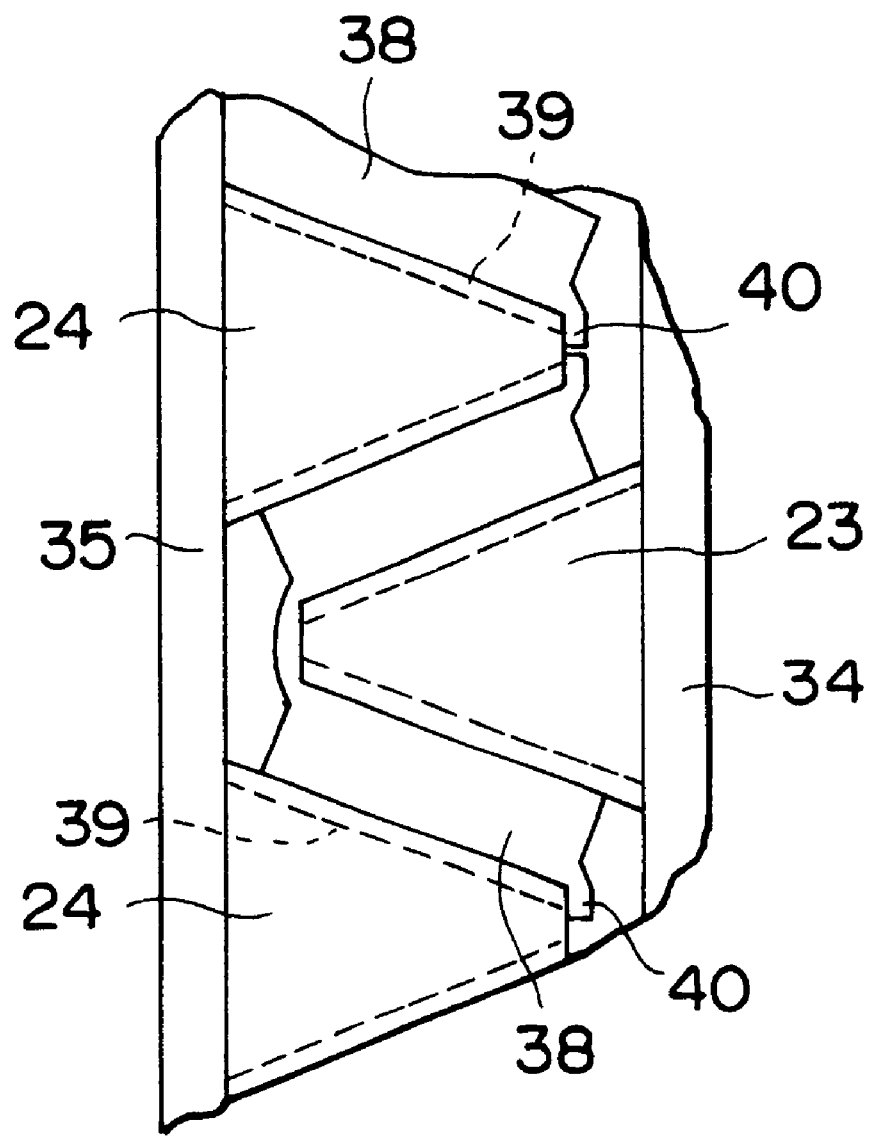
FIG. 4 is a top plan view of an essential portion of the rotor shown in FIG. 1.

FIG. 1 is a sectional view illustrating a rotor 30 of a vehicular AC generator in accordance with the present invention; FIG. 2 is a side view of a bobbin 32 and radially extending magnetic portions incorporated in the rotor shown in FIG. 1; FIG. 3 is a sectional view at the line III—III of FIG. 2; and FIG. 4 is a top plan view of an essential portion of the rotor shown in FIG. 1.

The rotor 30 is provided with a rotor coil 31 through which current flows to generate magnetic flux, a field core assembly 14 that is provided such that it covers the rotor coil 31 and in which magnetic poles are formed by magnetic flux, and hexahedral magnetic portions 38 secured to the field core assembly 14.

The field core assembly 14 has a paired structure comprising a first field core member 21 and a second field core member 22 alternately meshed with each other. The first field core member 21 and the second field core member 22 respectively have triangular magnetic poles 23 and 24 made of iron.

The rotor coil 31 is equipped with the bobbin 32 and a conductor 33 wound around the bobbin 32.

The bobbin 32 is provided with: a first flange 34; a second flange 35 opposed to the first flange 34; a cylindrical portion 36 joined to the first flange 34 and the second flange 35; and rotation stoppers 37 which are formed on the first flange 34 and the second flange 35, respectively, so that they project in the axial direction of the rotor coil 31 and are fitted in the base portions between the triangular magnetic poles 23 and 24.

The magnetic portions 38 are joined to the second flange 35, have tapered fitting portions 39 formed on both sides thereof, and have engaging portions 40 formed at the distal ends thereof. The magnetic portions 38 are disposed so as to reduce the leakage of magnetic flux between the first triangular magnetic poles 23 and the second triangular magnetic poles 24. More specifically, the magnetic portions 38 are arranged such that the N-pole surfaces of the magnetic portions 38 face the triangular magnetic poles 23 magnetized to the N pole, while the S-pole surfaces of the magnetic portions 38 face the triangular magnetic poles 24 magnetized to the S pole.

The aforesaid bobbin 32 and the magnetic portions 38 connected to the bobbin 32 are manufactured according to the following procedure. First, the first flange 34, the second flange 35, the cylindrical portion 36, rotation stoppers 37, and inter-magnetic-pole members to be disposed between the triangular magnetic poles are integrally formed by injection molding using a magnetic resin composed of a polyamide-based resin with ferrite-based iron filings mixed therein. Then, a magnetic field is applied to only the inter-magnetic-pole members to magnetize them so as to form the magnetic portions 38 composed of magnetic material. The second flange 35, the cylindrical portion 36, and the rotation stoppers 37 constituting the bobbin 32 are not magnetized and have an insulating function.

The stator 8 is provided with a stator core 15 and a stator coil 16, composed of a conductor wound around the stator core 15, in which alternating current is generated as the magnetic flux from the rotor coil 31 changes when the rotor 30 rotates.

The operation of the vehicular AC generator configured as set forth above will now be explained. Current is supplied from a battery, not shown, to the rotor coil 31 via the brushes 10 and the slip ring 9 so as to generate magnetic flux. The N magnetic pole is formed on the triangular magnetic poles 23 of the first field core member 21, while the S magnetic pole is formed on the triangular magnetic poles 24 of the second field core member 22. The pulley 4 is driven by an engine and the rotor 30 is rotated through the shaft 6, so that a rotary magnetic field is imparted to the stator coil 16, thus generating an electromotive force in the stator coil 16. This AC electromotive force is rectified into direct current through the rectifier 12 and the voltage magnitude thereof is adjusted by the regulator 18 before it is supplied to the battery.

The fitting portions 39 of the magnetic portions 38 are fitted to the side portions of the triangular magnetic poles 23 and 24, and the engaging portions 40 are engaged with the ends of the triangular magnetic poles 23 and 24. Hence, even when the magnetic portions 38 are subjected to centrifugal force or the like, generated when the rotor 30 rotates at high speed, the magnetic portions 38 do not shift in the radial or axial directions of the rotor 30 and therefore do not separate from the triangular magnetic poles 23 and 24. Further, the rotation stoppers 37 fitted in the base portions between the triangular magnetic poles 23 and 24 prevent the rotor coil 31 from shifting in relation to the field core 14.

[Second Embodiment]

Figure 5:
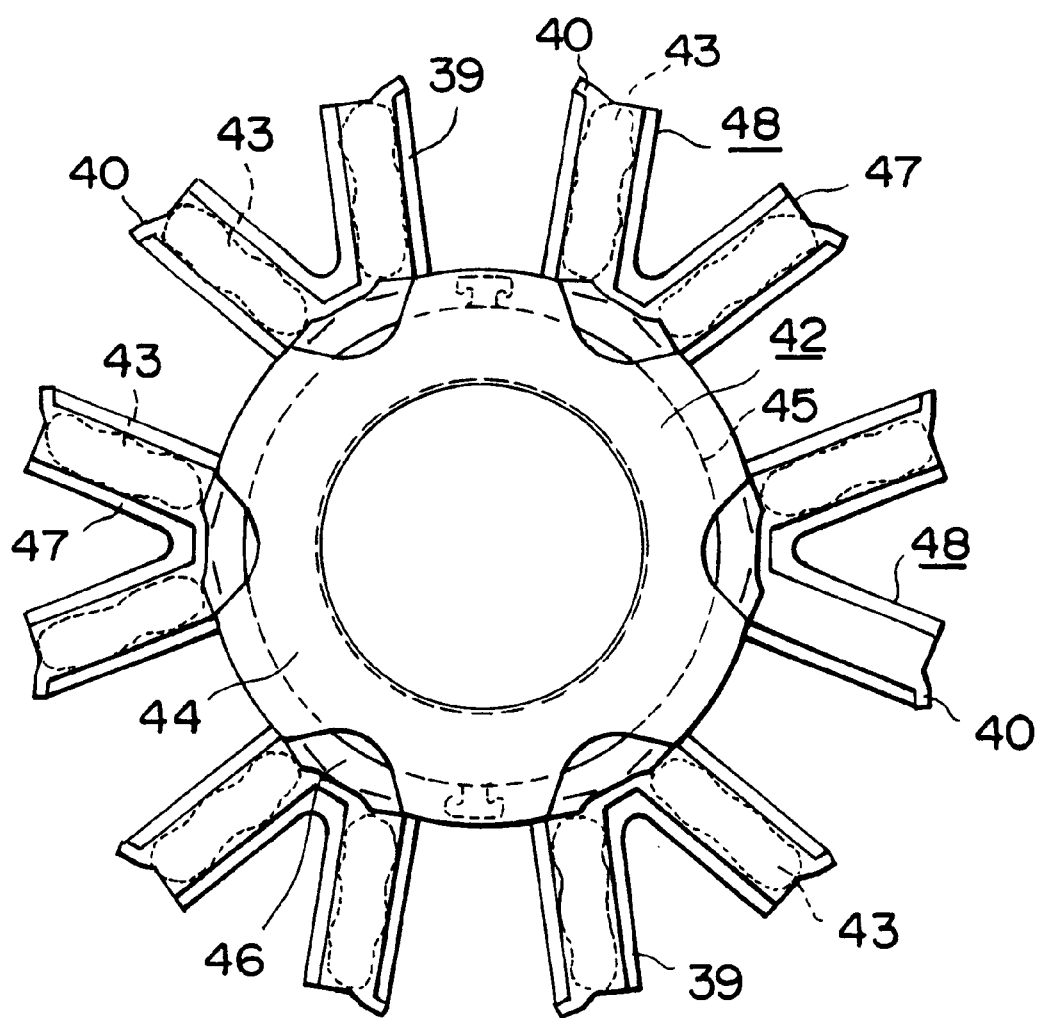
FIG. 5 is a side view showing a bobbin and radially extending magnetic portions, which are included in a rotor of a vehicular AC generator of a second embodiment in accordance with the present invention.

FIG. 5 is a side view showing a bobbin 42 and radially extending magnetic portions 48 included in a rotor of a vehicular AC generator of a second embodiment.

The second embodiment differs from the first embodiment in that the magnetic portions 48 are composed of magnetic members 43 formed from a magnetic material having a magnetic resin of a polyamide-based resin with ferrite-based iron filings mixed therein, and covers 47 are composed of a polyamide-based resin which cover the magnetic members 43. The covers 47, the first flange, a second flange 44, a cylindrical portion 45, and rotation stoppers 46, constituting the bobbin 42, are all made of the same polyamide-based resin.

In the second embodiment, the inter-magnetic-pole members to be disposed between the rectangular magnetic poles are formed by injection molding with a magnetic resin. Then the inter-magnetic-pole members are magnetized to form the magnetic members 43. Then, the magnetic members 43 are placed in a mold and a polyamide-based resin is injection molded to form the bobbin 42 and the magnetic portions 48 integral with the bobbin 42. Alternatively, the step of making the magnetic members 43 by magnetizing a magnetic resin may be implemented after forming the bobbin.

In the first embodiment, costly magnetic resin is used for the entire bobbin 32 and the magnetic portions 38, whereas in the second embodiment the costly magnetic resin is used only for the magnetic members 43 of the magnetic portions 48, thus permitting lower manufacturing cost of the rotor coil.

[Third Embodiment]

Figure 6:
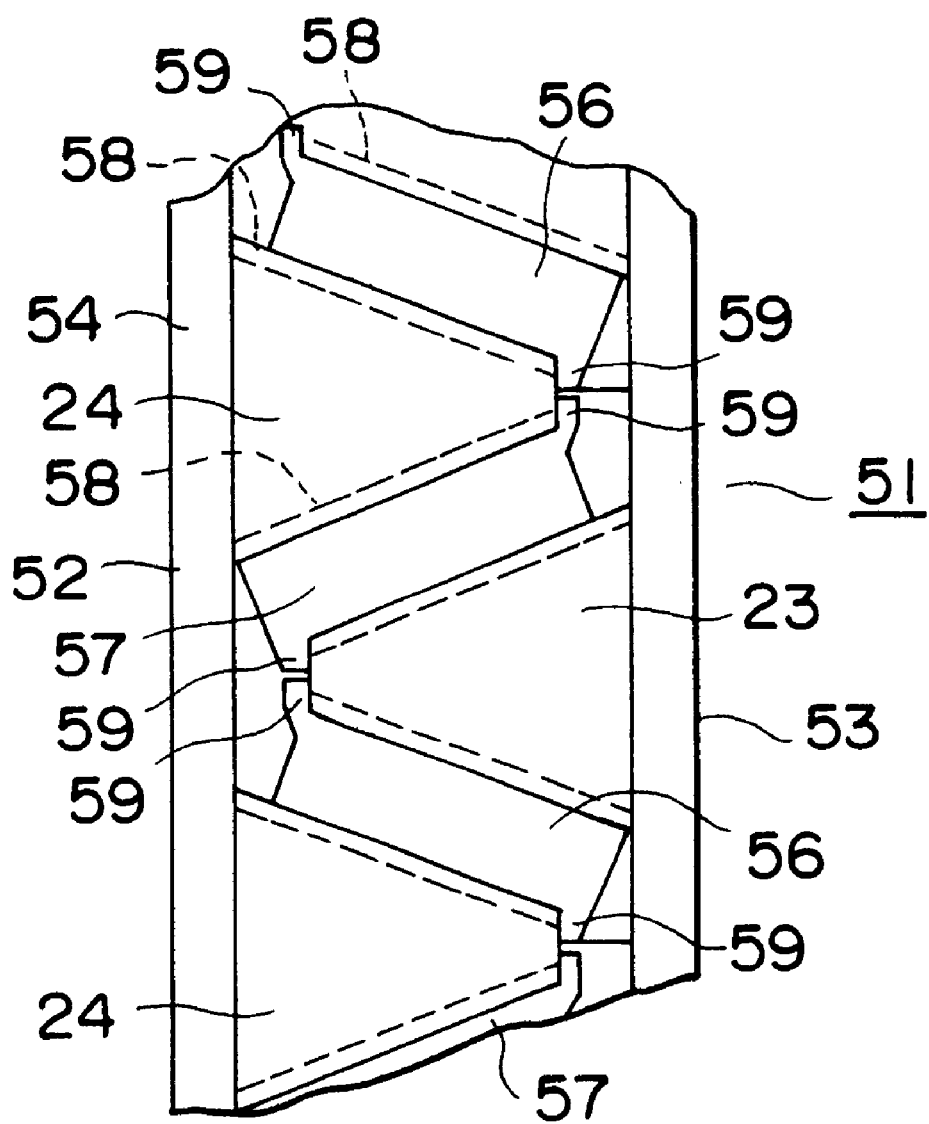
FIG. 6 is a top plan view of an essential portion of a rotor of a vehicular AC generator of a third embodiment in accordance with the present invention.
Figure 7:
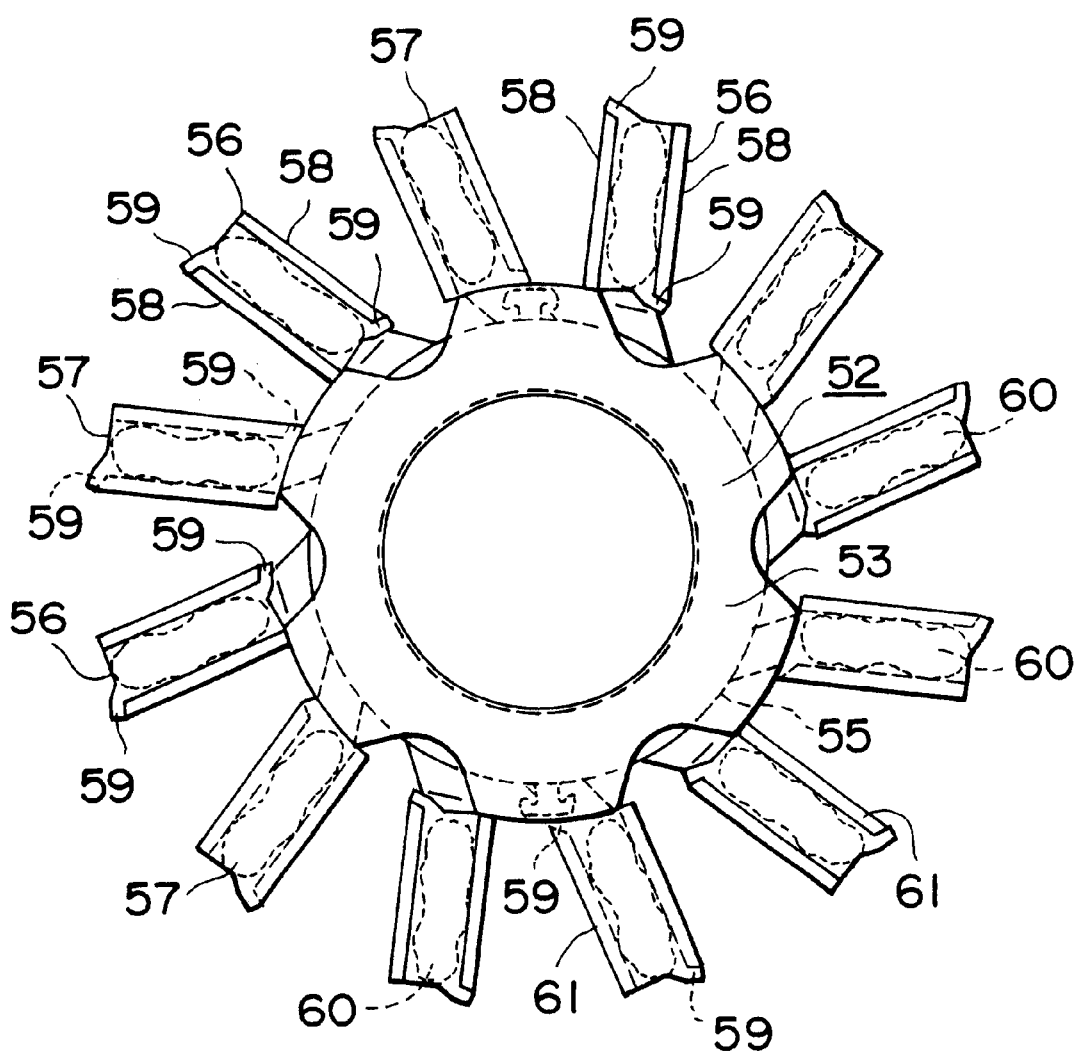
FIG. 7 is a side view of a bobbin and radially extending magnetic portions, which are included in the rotor shown in FIG. 6.

FIG. 6 is a top plan view of an essential portion of a rotor coil 51 incorporated in a rotor of a vehicular AC generator of a third embodiment, and FIG. 7 is a side view of a bobbin 52 and radially extending magnetic portions shown in FIG. 6.

The bobbin 52 is equipped with a first flange 53, a second flange 54 opposed to the first flange 53, and a cylindrical portion 55 joined to the second flange 54 and the first flange 53. Six hexahedral first magnetic portions 56 are connected circumferentially on the outer periphery of the first flange 53 and six hexahedral second magnetic portions 57 are connected circumferentially on the outer periphery of the second flange 54. Each of the first magnetic portions 56 and the second magnetic portions 57 has fitting portions 58 on both sides thereof and protuding engaging portions 59 on both ends thereof. The first magnetic portions 56 and the second magnetic portions 57 are disposed between the first triangular magnetic poles 23 and the second triangular magnetic poles 24 so as to reduce the leakage of the magnetic flux between the first triangular magnetic poles 23 and the second triangular magnetic poles 24.

These magnetic portions 56 and 57 are composed of magnetic members 60 made of oxide magnets, a magnetic material, and covers 61, which cover the magnetic members 60 and which are made from a polyamide-based resin.

In the third embodiment, the magnetic members 60 are placed in a mold, and a polyamide-based resin is injection molded to form the bobbin 52 and the first magnetic portions 56 and the second magnetic portion 57 integral with the bobbin 52.

[Fourth Embodiment]

Figure 8:
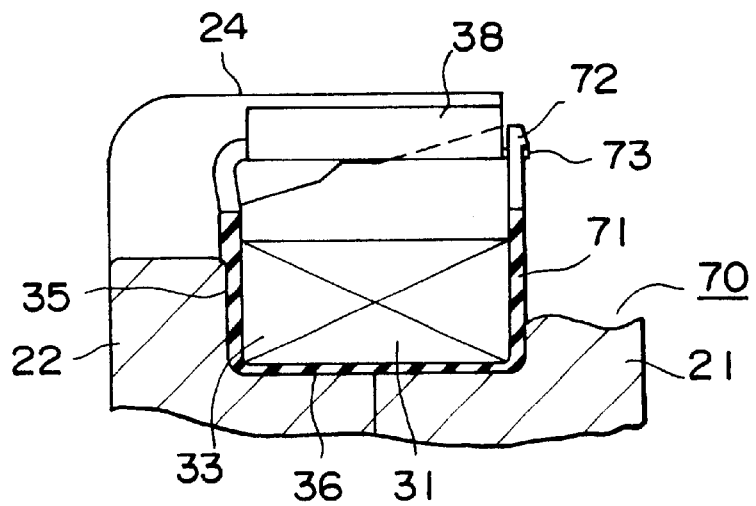
FIG. 8 is a sectional view of an essential portion of a rotor of a vehicular AC generator of a fourth embodiment in accordance with the present invention.
Figure 9:
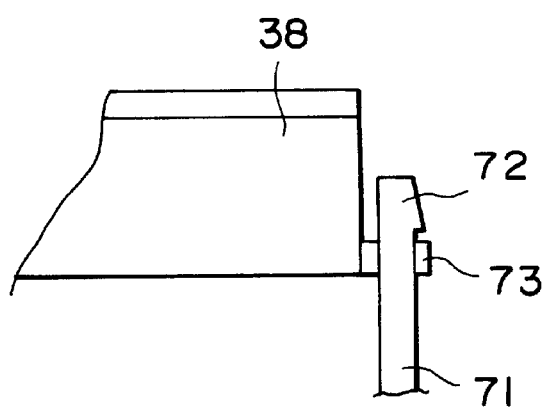
FIG. 9 is an enlarged view of the essential portion shown in FIG. 8.

FIG. 8 is a sectional view of an essential portion of a rotor 70 of a vehicular AC generator in accordance with the present invention and FIG. 9 is an enlarged view of the essential portion shown in FIG. 8. The fourth embodiment is different from the first embodiment in that a plurality of locking portions 72 opposed to the distal ends of the magnetic portions 38 are formed on the outer periphery of a first flange 71, and the locking portions 72 are engaged with mating portions 73 formed on the distal ends of the magnetic portions 38.

In this embodiment, after the conductor 33 is wound around the cylindrical portion 36 of the bobbin 32, the mating portions 73 on the distal ends of the magnetic portions 38 can be retained at the locking portions 72 when the base portions of the magnetic portions 38 are bent to attach the magnetic portions 38 between the triangular magnetic poles 23 and 24, thus enabling the magnetic portions 38, which are usually spread radially, to be easily joined. This permits easier assembly of the rotor 70.

The locking portions 72 and the mating portions 73 may be removed after completing the assembly of the rotor 70. In this case, the locking portions 72 and the mating portions 73 can be prevented from separating due to centrifugal force generated when the rotor 70 rotates, thus protecting the component parts of the generator from damage.

The embodiments have been explained by referring to the rotor of the vehicular AC generator as the rotor of a dynamo-electric machine; the present invention, however, can obviously be applied also, for example, to the rotor of an electric motor.

Thus, with the rotor for a dynamo-electric machine in accordance with the present invention, a plurality of magnetic portions are provided between adjacent ones of triangular magnetic poles in an orientation that reduces the leakage of magnetic flux between the triangular magnetic poles, and are joined to at least one of a first flange and a second flange. Therefore, the magnetic portions can be installed between triangular magnetic poles more efficiently, and the manufacturing efficiency of the rotor is increased.

Also, in the rotor for a dynamo-electric machine according to the present invention, magnetic portions have magnetic members made of a magnetic material and covers which cover the magnetic members and which are made of the same resin material as that of a bobbin. Therefore, costly magnetic material is employed for only part of the magnetic members so that the manufacturing cost of the rotor can be reduced.

Further, in the rotor for a dynamo-electric machine according to the present invention, fitting portions, which are fitted on the sides of the triangular magnetic poles to prevent the magnetic portions from shifting radially outward, are formed on the sides of the magnetic portions. Therefore, the magnetic portions can be prevented from radially sepatating when the rotor rotates.

Futhermore, in the rotor for a dynamo-electric machine according to the present invention, engaging portions, which engage with ends of triangular magnetic poles to prevent magnetic portions from shifting axially, are formed on the ends of the magnetic portions. Therefore, the magnetic portions can be prevented from axially separating when the rotor rotates.

Futher, in the rotor for a dynamo-electric machine according to the present invention, locking portions, which engage mating portions formed on the distal ends of magnetic portions to retain the magnetic portions between triangular magnetic poles, are formed on the outer periphery of either a first flange or a second flange. Therefore, the peripherally arranged magnetic portions can be easily retained between the triangular magnetic poles, permitting easier installation of the magnetic portions between the triangular magnetic poles.

Futhermore, with the method of manufacturing a rotor of a dynamo-electric machine in accordance with the present invention, magnetic members are placed in a mold and resin is injection molded to form a bobbin and magnetic portions integral with the bobbin. Therefore, the magnetic portions integral with the bobbin can be simply manufactured.

What is claimed is:

1. A rotor of a dynamo-electric machine, said rotor comprising:
   a rotor coil comprising a bobbin having a first flange and a second flange opposed to each other, and a conductor wound around said bobbin, wherein current flows through said conductor to generate magnetic flux;
   a field core assembly covering said rotor coil, said field core assembly comprising a first field core member and a second field core member respectively having triangular magnetic poles alternately meshed with each other;

a plurality of magnetic portions provided between adjacent ones of said triangular magnetic poles in an orientation that reduces the leakage of magnetic flux between said triangular magnetic poles, and wherein said plurality of magnetic portions abut at least one of said first flange and said second flange in order to join said plurality of magnetic portions to said bobbin; and locking portions, wherein mating portions are formed on distal ends of said magnetic portions, and wherein said locking portions engage with said mating portions to retain said magnetic portions between the triangular magnetic poles, wherein said locking portions are formed on an outer periphery of one of said first flange and said second flange.

2. A rotor of a dynamo-electric machine, said rotor comprising:

a rotor coil comprising a bobbin having a first flange and a second flange opposed to each other, and a conductor wound around said bobbin, wherein current flows through said conductor to generate magnetic flux;

a field core assembly covering said rotor coil, said field core assembly comprising a first field core member and a second field core member respectively having triangular magnetic poles alternately meshed with each other; and a plurality of magnetic portions provided between adjacent ones of said triangular magnetic poles in an orientation that reduces the leakage of magnetic flux between said triangular magnetic poles, and wherein said plurality of magnetic portions abut at least one of said first flange and said second flange, wherein said bobbin further comprises a cylindrical portion, rotation stoppers, and inter-magnetic pole members, and wherein said bobbin is composed of a resin mixed with iron filings, and wherein said inter-magnetic pole members are disposed between adjacent ones of said triangular magnetic poles, and wherein said plurality of magnetic members are formed by a magnetic field applied to a part of said inter-magnetic pole members, and wherein said cylindrical portion, said rotation stoppers, and said second flange remain unmagnetized to perform an insulating function, and wherein said cylindrical portion is joined to both said first flange and said second flange, and wherein said rotation stoppers are joined to said magnetic portions.

3. A rotor of a dynamo-electric machine, said rotor comprising:

a rotor coil comprising a bobbin having a first flange and a second flange opposed to each other, and a conductor wound around said bobbin, wherein current flows through said conductor to generate magnetic flux;

a field core assembly covering said rotor coil, said field core assembly comprising a first field core member and a second field core member respectively having triangular magnetic poles alternately meshed with each other; and a plurality of magnetic portions provided between adjacent ones of said triangular magnetic poles in an orientation that reduces the leakage of magnetic flux between said triangular magnetic poles, and wherein said plurality of magnetic portions abut at least one of said first flange and said second flange, wherein said plurality of magnetic portions are integrally formed with said bobbin by injection molding.

* * * * *